(12) United States Patent
Kato

(10) Patent No.: US 11,626,823 B2
(45) Date of Patent: Apr. 11, 2023

(54) POWER SUPPLY SYSTEM AND METHOD OF CONTROLLING THE POWER SUPPLY SYSTEM

(71) Applicant: SUBARU CORPORATION, Tokyo (JP)

(72) Inventor: Daisuke Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 101 days.

(21) Appl. No.: 16/778,941

(22) Filed: Jan. 31, 2020

(65) Prior Publication Data

US 2020/0259440 A1 Aug. 13, 2020

(30) Foreign Application Priority Data

Feb. 7, 2019 (JP) .............................. JP2019-020955

(51) Int. Cl.
| | | |
|---|---|---|
| *H03K 17/567* | (2006.01) | |
| *H02P 25/02* | (2016.01) | |
| *H01H 47/02* | (2006.01) | |

(52) U.S. Cl.
CPC ............. *H02P 25/02* (2013.01); *H01H 47/02* (2013.01)

(58) Field of Classification Search
CPC ...... H02P 25/02; H02P 29/028; H02P 29/025; H01H 47/02; H01H 47/002
See application file for complete search history.

(56) References Cited

U.S. PATENT DOCUMENTS

| | | | |
|---|---|---|---|
| 2007/0205771 A1* | 9/2007 | Drake | G01R 31/3278 |
| | | | 324/418 |
| 2009/0150027 A1 | 6/2009 | Takamatsu et al. | |
| 2011/0228438 A1* | 9/2011 | Koh | H01H 1/0015 |
| | | | 361/187 |
| 2012/0234124 A1 | 9/2012 | Nozaki et al. | |
| 2014/0254050 A1* | 9/2014 | Haines | H02H 3/16 |
| | | | 361/42 |

(Continued)

FOREIGN PATENT DOCUMENTS

| | | |
|---|---|---|
| JP | 2009-101807 A | 5/2009 |
| JP | 2010-148274 A | 7/2010 |

(Continued)

OTHER PUBLICATIONS

Japanese Office Action dated Aug. 30, 2022, in Japanese corresponding Patent Application No. 2019-020955, with an English translation thereof.

*Primary Examiner* — Muhammad S Islam
(74) *Attorney, Agent, or Firm* — McGinn I.P. Law Group, PLLC.

(57) ABSTRACT

A power supply system includes a power source, a relay, a switch, and a controller. The relay is interposed between the power source and a load. The switch is configured to be coupled to the load in a state where the switch allows or disallows for power supply from the power source to the load when the relay is in a closed state. The controller is configured to control an operation of the switch. The controller is configured to execute forced driving control at a time of a closing operation of the relay. The forced driving control causes the switch to operate independently of a request for driving the load and thereby causes power to be supplied from the power source to the load.

5 Claims, 5 Drawing Sheets

(56) References Cited

U.S. PATENT DOCUMENTS

| | | | |
|---|---|---|---|
| 2015/0092464 A1* | 4/2015 | Uehira | H02J 3/381 363/95 |
| 2017/0115681 A1 | 4/2017 | Fujimoto | |
| 2018/0182583 A1* | 6/2018 | Kato | H03K 17/567 |

FOREIGN PATENT DOCUMENTS

| | | |
|---|---|---|
| JP | 2017-073239 A | 4/2017 |
| JP | 2017-084561 A | 5/2017 |
| WO | WO 2011/052074 A1 | 10/2009 |

* cited by examiner

POWER SUPPLY SYSTEM AND METHOD OF CONTROLLING THE POWER SUPPLY SYSTEM

CROSS-REFERENCE TO RELATED APPLICATIONS

The present application claims priority from Japanese Patent Application No. 2019-020955 filed on Feb. 7, 2019, the entire contents of which are hereby incorporated by reference.

BACKGROUND

The technology relates to a power supply system and a method of controlling the power supply system.

In a power supply system, a relay is provided between a power source and a load. Opening or closing the relay allows or disallows for electrical coupling between the power source and the load. In a case where the relay experiences a continuity defect, it may be desired to appropriately resolve the continuity defect in the relay in order to appropriately supply power to the load.

SUMMARY

An aspect of the technology provides a power supply system that includes a power source, a relay, a switch, and a controller. The relay is interposed between the power source and a load. The switch is configured to be coupled to the load in a state where the switch allows or disallows for power supply from the power source to the load when the relay is in a closed state. The controller is configured to control an operation of the switch. The controller is configured to execute forced driving control at a time of a closing operation of the relay. The forced driving control causes the switch to operate independently of a request for driving the load and thereby causes power to be supplied from the power source to the load.

An aspect of the technology provides a power supply system that includes a power source, a relay, and circuitry. The relay is interposed between the power source and a load. The relay is configured to allow for power supply from the power source to the load when the relay is in a closed state. The circuitry is configured to detect an operation state of the relay at a time of a closing operation of the relay. The relay is configured to allow or disallow for the power supply from the power source to the load in accordance with a request for driving the load when the detected operation state indicates that the relay is in a usual operation state. The circuitry is configured to cause power to be supplied from the power source to the load independently of the request for driving the load when the detected operation state indicates that the relay is in an abnormal continuity state.

An aspect of the technology provides a method of controlling a power supply system including a power source, a relay interposed between the power source and a load, and a switch coupled to the load in a state where the switch allows or disallows for power supply from the power source to the load when the relay is in a closed state. The method includes: detecting an operation state of the relay at a time of a closing operation of the relay; allowing or disallowing for the power supply from the power source to the load in accordance with a request for driving the load when the detected operation state indicates that the relay is in a usual operation state; and causing the switch to operate independently of the request for driving the load and thereby causing power to be supplied from the power source to the load, when the detected operation state indicates that the relay is in an abnormal continuity state.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
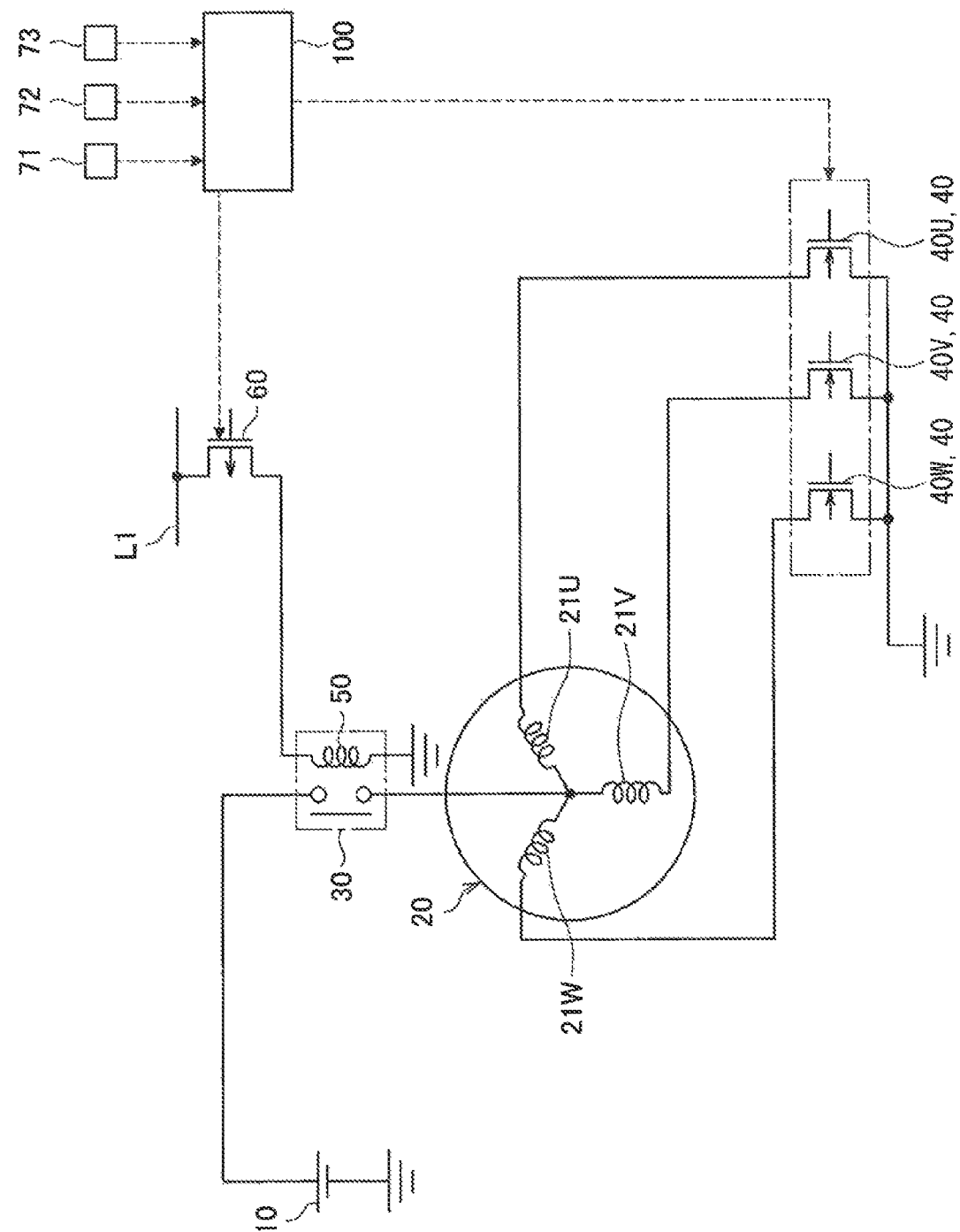
FIG. 1 is a schematic diagram illustrating an example of an outline configuration of a power supply system according to an example embodiment of the technology.

Hereinafter, some example embodiments of the technology will be described in detail with reference to the appended drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. In the specification and the drawings, constituent elements having substantially identical configurations are given identical reference characters, and duplicate descriptions thereof will be omitted.

According to the example embodiment, provided is a power supply system provided with an auxiliary battery as a power source. One possible cause of a continuity defect in a relay included in the power supply system according to the example embodiment may be an oxide film formed in the relay. In a case where the oxide film is formed in the relay, the oxide film may be expected to experience dielectric breakdown as an inrush current is made to flow through the relay at the time of the closing operation of the relay. However, if the switch directed to allowing or disallowing for power supply from the power source to the load when the relay is in the closed state is coupled in series to the load, this switch may basically be closed in response to the request for driving the load. Therefore, the switch may enter an open state at the time of the closing operation of the relay, and the inrush current may not flow through the relay. Accordingly, in such a power supply system, the oxide film may not necessarily experience dielectric breakdown at the time of the closing operation of the relay, which leads to a concern that it may not be possible to resolve the continuity defect in the relay 30 in some cases.

It may be desired that any continuity defect that occurs in the relay be appropriately resolved or at least be mitigated.

A power supply system 1 in which an electric motor 20 is used as a load according to an example embodiment of the technology will be described below. As will be described later, the load according to the example embodiment of the technology is not particularly limited to this example. In addition, in the power supply system 1 described below, an auxiliary battery 10 may be used as a power source according to an example embodiment of the technology. The power source according to the example embodiment of the technology may be, however, any power source that stores power and is not particularly limited to this example. As one example of a power supply system according to an example embodiment of the disclosure, the power supply system 1 to be provided in a vehicle will be described. The power supply system according to the example embodiment of the technology is, however, not particularly limited to this example and may be provided in a variety of apparatuses and systems other than a vehicle.

[1. Configuration of Power Supply System]

Figure 2:
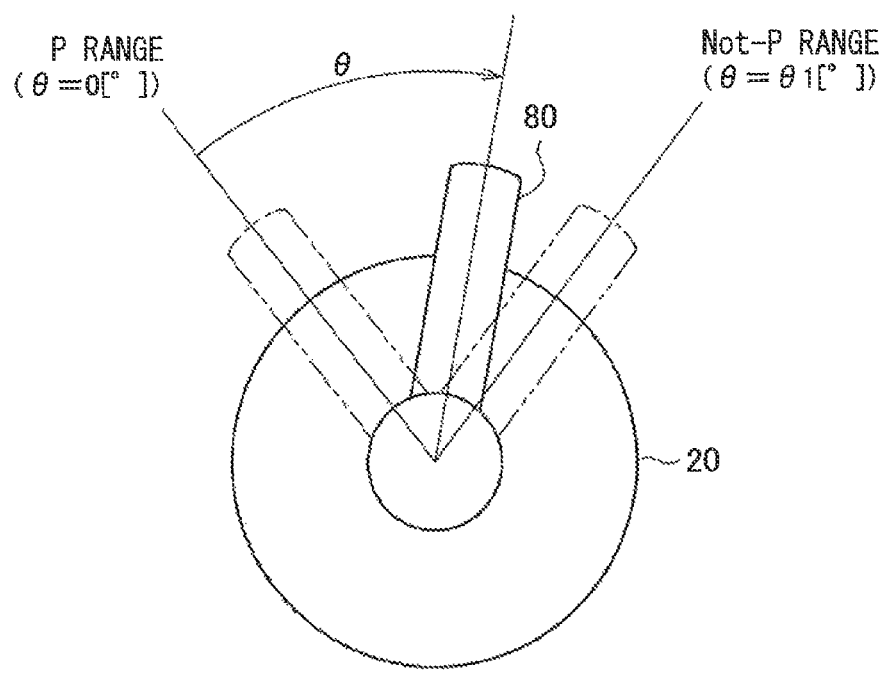
FIG. 2 is a schematic diagram illustrating an example of a relationship between an angle of rotation of an electric motor and a shift range according to the example embodiment.

With reference to FIGS. 1 and 2, a configuration of the power supply system 1 according to an example embodiment of the technology will be described.

FIG. 1 is a schematic diagram illustrating an example of a an outline configuration of the power supply system 1.

The power supply system 1 may be provided in a vehicle. The power supply system 1 may be directed to supplying power to an electric motor 20 that switches a shift range of the vehicle. The electric motor 20 may be referred to below simply as a motor 20.

In a specific but non-limiting example, as illustrated in FIG. 1, the power supply system 1 may include an auxiliary battery 10, a relay 30, the motor 20, a switch 40, and a control device 100 that controls operations of the relay 30 and the switch 40. In one embodiment, the control device 100 may serve as a "controller." The power supply system 1 may further include a voltage sensor 71, a current sensor 72, and a temperature sensor 73. In one embodiment, the auxiliary battery 10 may serve as a "power source." In one embodiment, the motor 20 may serve as a "load" that is coupled to the auxiliary battery 10 via the relay 30. In one embodiment, the switch 40 may serve as a "switch" that is coupled to the motor 20 serving as the "load." In the example embodiment, the switch 40 may be coupled in series to the motor 20.

When the power supply system 1 is being stopped, the relay 30 may be in an open state, and the auxiliary battery 10 and the motor 20 may be electrically decoupled from each other. When the power supply system 1 is requested to start, e.g., when a driver has performed a specific operation on an ignition switch, the relay 30 may be closed, i.e., the relay 30 may undergo a closing operation. The auxiliary battery 10 and the motor 20 may thereby become electrically coupled to each other. Thereafter, as the switch 40 operates in response to a request for driving the motor 20, the motor 20 may be driven with power supplied from the auxiliary battery 10 to the motor 20.

The auxiliary battery 10 may store power to be supplied to auxiliaries within the vehicle including the motor 20. The auxiliary battery 10 may be a 12-volt battery, for example. Non-limiting examples of storage batteries that may be used as the auxiliary battery 10 may include a lithium-ion battery, a lithium-ion polymer battery, a nickel-hydrogen battery, a nickel-cadmium battery, and a lead-acid battery.

The motor 20 may serve as a motive power source that switches the shift range of the vehicle. In a specific but non-limiting example, the motor 20 may be a polyphase motor. To put it in a greater detail, the motor 20 may be a three-phase four-wire motor having three phases including a U-phase, a V-phase, and a W-phase. The motor 20 may include, as exciting coils, a coil 21U of the U-phase, a coil 21V of the V-phase, and a coil 21W of the W-phase. A neutral point where the above coils are coupled may be coupled to the relay 30. As a current is applied to each of the coils, motive power may be generated in the motor 20.

In a specific but non-limiting example, the shift range of the vehicle may be switched in accordance with an angle of rotation θ of the motor 20. For example, upon a shift range being selected by the driver through an input device, such as a button, information indicating the selected shift range may be outputted from the input device to the control device 100. The control device 100 may control the operation of the motor 20 to bring the angle of rotation θ of the motor 20 to an angle corresponding to the selected shift range. Controlling the operation of the motor 20 in this manner may achieve shift range switching where a technique of so-called shift-by-wire is used.

FIG. 2 is a schematic diagram illustrating an example of a relationship between the angle of rotation θ of the motor 20 and the shift range.

For example, as illustrated in FIG. 2, a lever 80 may be fixed to an output shaft of the motor 20, and various clutches in a motive power transmission mechanism of the vehicle may operate in tandem with the rotation of the lever 80. This configuration may achieve the shift range switching in accordance with the angle of rotation θ of the motor 20.

In the example illustrated in FIG. 2, the vehicle in which the power supply system 1 is provided may be an electric vehicle that includes only a driving motor as a driving source. Therefore, the shift range may be switched between a P range in which transmission of motive power from the driving motor to a driving wheel is cut off and a not-P range in which the motive power may be transmitted from the driving motor to the driving wheel. In a specific but non-limiting example, in FIG. 2, the shift range may enter the P range in a case where the angle of rotation θ of the motor 20 is 0[°], and the shift range may enter the not-P range in a case where the angle of rotation θ of the motor 20 is θ1[°]. In this example, the angle of rotation θ of the motor 20 may be restricted within a range from an angle corresponding to the P range (0[°] in the example illustrated in FIG. 2) to an angle corresponding to the not-P range (θ1[°] in the example illustrated in FIG. 2.) In other words, the angle of rotation θ may be restricted to the angle corresponding to the P range in the direction in which the angle of rotation θ decreases and restricted to the angle corresponding to the not-P range in the direction in which the angle of rotation θ increases.

In this example, the power supply system 1 may be configured to stop in a state in which the shift range is in the P range. When the power supply system 1 is being stopped, the relay 30 may be in the open state, as described above. Therefore, when the relay 30 is in the open state, the angle of rotation θ of the motor 20 may be in a state of being restricted to the angle corresponding to the P range (0[°] in the example illustrated in FIG. 2.)

As described above, the angle of rotation θ of the motor 20 may be restricted to a predetermined angle. In a specific but non-limiting example, the angle of rotation θ of the motor 20 may be restricted to the angle corresponding to the P range. When the relay 30 is in the open state, the angle of rotation θ of the motor 20 may be in a state of being restricted to the stated predetermined angle.

The relay 30 may be provided to allow or disallow for electrical coupling between the auxiliary battery 10 and the motor 20. In a specific but non-limiting example, the auxiliary battery 10 and the motor 20 may be in a state of being electrically decoupled from each other when the relay 30 is in the open state, and the auxiliary battery 10 and the motor 20 may be in a state of being electrically coupled to each other when the relay 30 is in a closed state.

In a specific but non-limiting example, the relay 30 may include an electromagnetic coil 50 that produces a magnetic field that closes the relay 30. The electromagnetic coil 50 may be wound upon an iron core. The iron core may be magnetized by a magnetic field produced as a current flows through the electromagnetic coil 50, and a movable member in the relay 30 may be attracted to the iron core. This may cause the relay 30 to enter the closed state. In other words, the relay 30 may enter a state of allowing electricity to pass therethrough. In contrast, in a case where no current is flowing through the electromagnetic coil 50, restoring force caused by, for example but not limited to, a spring may act on the movable member in the relay 30, and the relay 30 may thus enter the open state. In other words, the relay 30 may enter a state of blocking the electricity.

One side of the electromagnetic coil 50 may be coupled to a power line L1 via a switch 60. The other side of the electromagnetic coil 50 may be grounded. The power line L1 may be supplied with power from the auxiliary battery 10, for example. The switch 60 may allow or disallow for electrical coupling between the power line L1 and the electromagnetic coil 50. Therefore, in accordance with the operation of the switch 60, switching may be performed between a state in which power is supplied from the power line L1 to the electromagnetic coil 50 and a state in which this power supply is being stopped. The switch 60 may be a semiconductor switch, for example.

The switch 40 may be coupled in series to the motor 20. The switch 40 may allow or disallow for power supply from the auxiliary battery 10 to the motor 20 when the relay 30 is in the closed state. In a specific but non-limiting example, as the switch 40 closes when the relay 30 is in the closed state, power may be supplied from the auxiliary battery 10 to the motor 20.

To put it in a greater detail, the switch 40 may be provided for each phase of the motor 20. In a specific but non-limiting example, the power supply system 1 may include, as the switch 40, a switch 40U coupled to the coil 21U and provided for the U-phase, a switch 40V coupled to the coil 21V and provided for the V-phase, and a switch 40W coupled to the coil 21W and provided for the W-phase. These switches 40U, 40V, and 40W may be coupled in parallel to one another. The switches 40U, 40V, and 40W may each be a semiconductor switch, for example. In a case where no particular distinction is made among the switches 40U, 40V, and 40W, the switches 40U, 40V, and 40W may simply be referred to below as the switch(es) 40.

For example, as the switch 40U closes when the relay 30 is in the closed state, a current may be applied to the U-phase. In other words, a current may flow through the coil 21U. As the switch 40V closes, a current may be applied to the V-phase. In other words, a current may flow through the coil 21V. As the switch 40W closes, a current may be applied to the W-phase. In other words, a current may flow through the coil 21W. In one specific but non-limiting example, generation of motive power by the motor 20 may be achieved as timing of applying a current to each phase in such a manner is controlled as appropriate.

The voltage sensor 71 may detect the voltage of each phase of the motor 20 and output a detection result to the control device 100.

The current sensor 72 may detect a current value of the current being applied to each phase of the motor 20 and output a detection result to the control device 100.

The temperature sensor 73 may detect a temperature of the motor 20 and output a detection result to the control device 100.

The temperature of the motor 20 itself detected by the temperature sensor 73 may be an example of an index that correlates with the temperature of the motor 20, but this index is not particularly limited to this example. For example, the index that correlates with the temperature of the motor 20 may be the temperature of the motor 20 itself as described above, may be a temperature of another component in the vicinity of the motor 20, or may be an outside temperature in the vicinity of the motor 20.

The control device 100 may include components such as a central processing unit (CPU), a read-only memory (ROM), or a random-access memory (RAM). The CPU may serve as an arithmetic operation processing device. The ROM may be a storage device that holds, for example but not limited to, a program and an arithmetic operation parameter used by the CPU. The RAM may be a storage device that temporarily holds, for example but not limited to, a parameter that varies as appropriate while the CPU executes an arithmetic operation.

The control device 100 may communicate with each device in the power supply system 1. For example, the control device 100 may communicate with the switch 40U, the switch 40V, the switch 40W, and the switch 60. The control device 100 may communicate with each device through a controller area network (CAN) communication, for example.

Operations of the control device 100 may be distributed to a plurality of control devices. In that case, the plurality of control devices may be allowed to be communicably coupled to each other via a communication bus, such as the CAN. The control device 100 may be configured to additionally perform another operation other than the operations described below.

In a specific but non-limiting example, the control device 100 may control power supply in the power supply system 1. To put it in greater detail, the control device 100 may control the operation of the switch 60 by outputting an operation instruction to the switch 60 through an electric signal. This control may allow the power supplied from the power line L1 to the electromagnetic coil 50 to be controlled, and the operation of the relay 30 may be controlled thereby. In addition, while the relay 30 is in the closed state, the control device 100 may control the operation of the switches 40U, 40V, and 40W by outputting an operation instruction to the switches 40U, 40V, and 40W through an electric signal. This control may allow a current that is to be applied to each phase of the motor 20 to be controlled, and the operation of the motor 20 may be controlled thereby. In this example, the control device 100 may so control the operation of the switches 40U, 40V, and 40W as to drive the motor 20 when there is a request that the motor 20 be driven. In a specific but non-limiting example, the control device 100 may so control the operation of the switches 40U, 40V, and 40W as to drive the motor 20 when the driver has requested that the shift range be changed.

In the power supply system 1 according to the example embodiment, the control device 100 may control the power supply to the motor 20 by controlling the operation of the relay 30 and the switch 40. In this example, the control device 100 may execute usual driving control corresponding to a request for driving the motor 20 at the time of a closing operation of the relay 30. In contrast, when a continuity defect has occurred in the relay 30, the control device 100 may execute forced driving control of supplying power from the auxiliary battery 10 to the motor 20 by closing the switch 40 independently of the request for driving the motor 20.

[2. Operation of Power Supply System]

Next, with reference to FIGS. 3 to 6, an operation of the power supply system 1 according to the example embodiment will be described.

Figure 3:
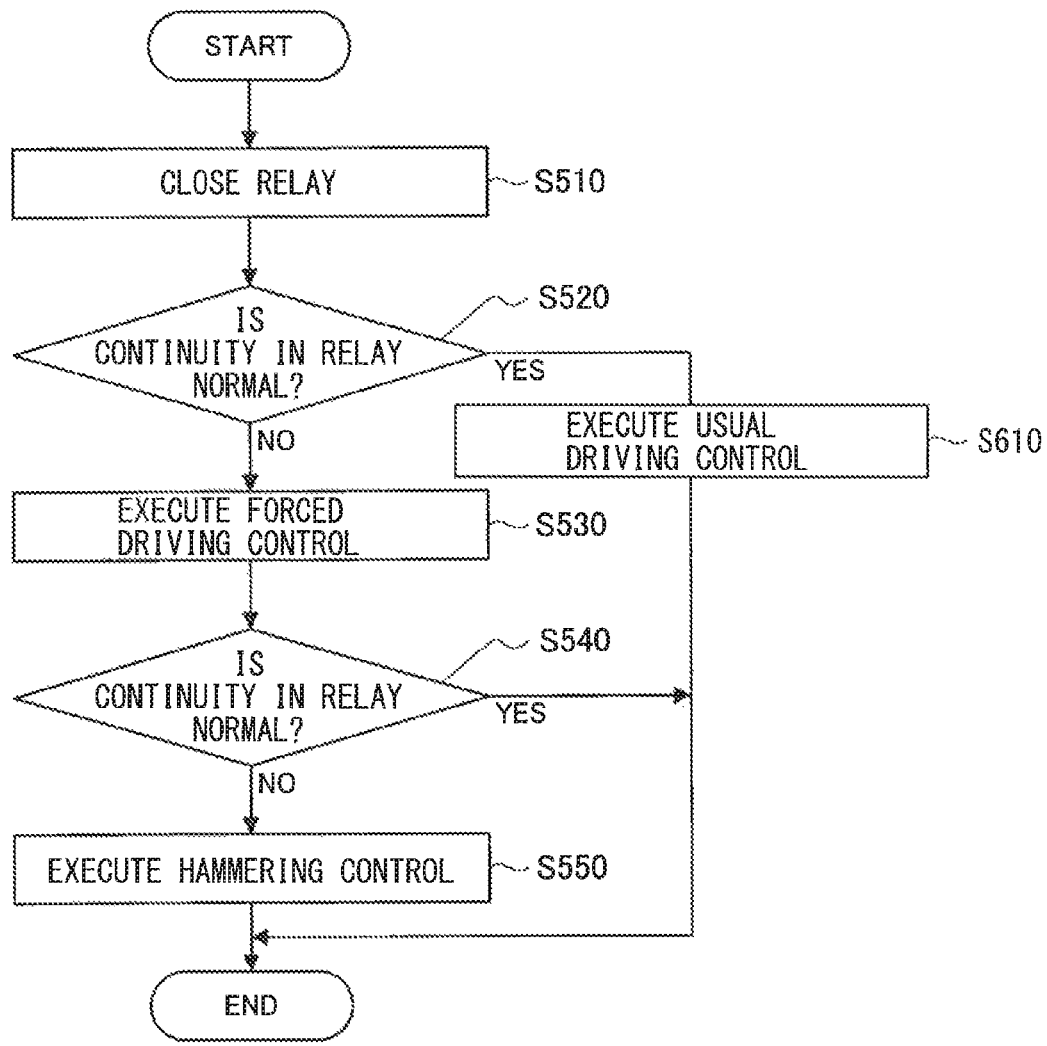
FIG. 3 is a flowchart illustrating an example of a flow of an overall process to be performed by a controller according to the example embodiment.

FIG. 3 is a flowchart illustrating an example of a flow of a process to be performed by the control device 100. In a specific but non-limiting example, the control flow illustrated in FIG. 3 may start when a request for starting the power supply system 1 is made. For example, the control flow illustrated in FIG. 3 may start when the driver has performed a specific operation on the ignition switch. When the control flow illustrated in FIG. 3 starts, the relay 30 may be in the open state, and the switches 40U, 40V, and 40W may each be in an open state.

Upon the control flow illustrated in FIG. 3 starting, in step S510, the control device 100 may first close the relay 30.

In a specific but non-limiting example, the control device 100 may close the switch 60 to supply power to the electromagnetic coil 50, and the control device 100 may thereby close the relay 30. In other words, the control device 100 may cause the relay 30 to perform the closing operation.

Thereafter, in step S520, the control device 100 may determine whether the continuity in the relay 30 is normal. In a case where the control device 100 has determined that the continuity in the relay 30 is normal (YES in step S520), the control device 100 may execute usual driving control (step S610) and end the control flow illustrated in FIG. 3. The usual driving control may be implemented as control of supplying power from the auxiliary battery 10 to the motor 20 by closing the switch 40 in response to the request for driving the motor 20. In one embodiment, the process in step S610 may serve as an operation, performed by an exemplified "circuitry" that allows or disallows for the power supply from the power source to the load in accordance with a request for driving the load when the detected operation state indicates that the relay is in a usual operation state. In contrast, in a case where the control device 100 has determined that the continuity in the relay 30 is not normal (NO in step S520), the flow may proceed to step S530.

For example, the control device 100 may be able to determine whether the continuity in the relay 30 is normal on the basis of a voltage of each phase of the motor 20 detected by the voltage sensor 71 at the time of the closing operation of the relay 30. In a specific but non-limiting example, the control device 100 may be able to determine that the continuity in the relay 30 is not normal in a case where, although the relay 30 has performed the closing operation, the voltage of each phase of the motor 20 is not as high as a voltage to be expected when the auxiliary battery 10 and the motor 20 are electrically coupled to each other.

In a case where the determination is NO in step S520, in step S530, the control device 100 may execute the forced driving control. The forced driving control may be control of supplying power from the auxiliary battery 10 to the motor 20 by closing the switch 40 independently of the request for driving the motor 20, as described above.

In a specific but non-limiting example, in the forced driving control, the control device 100 may close one or more switches 40 provided for a portion or all of the phases of the motor 20. In other words, in the forced driving control, the control device 100 may close one or more of the switches 40U, 40V, and 40W. In one embodiment, the process in step S530 may serve as an operation, performed by the exemplified "circuitry", that causes power to be supplied from the power source to the load independently of the request for driving the load when the detected operation state indicates that the relay is in an abnormal continuity state.

Figure 4:
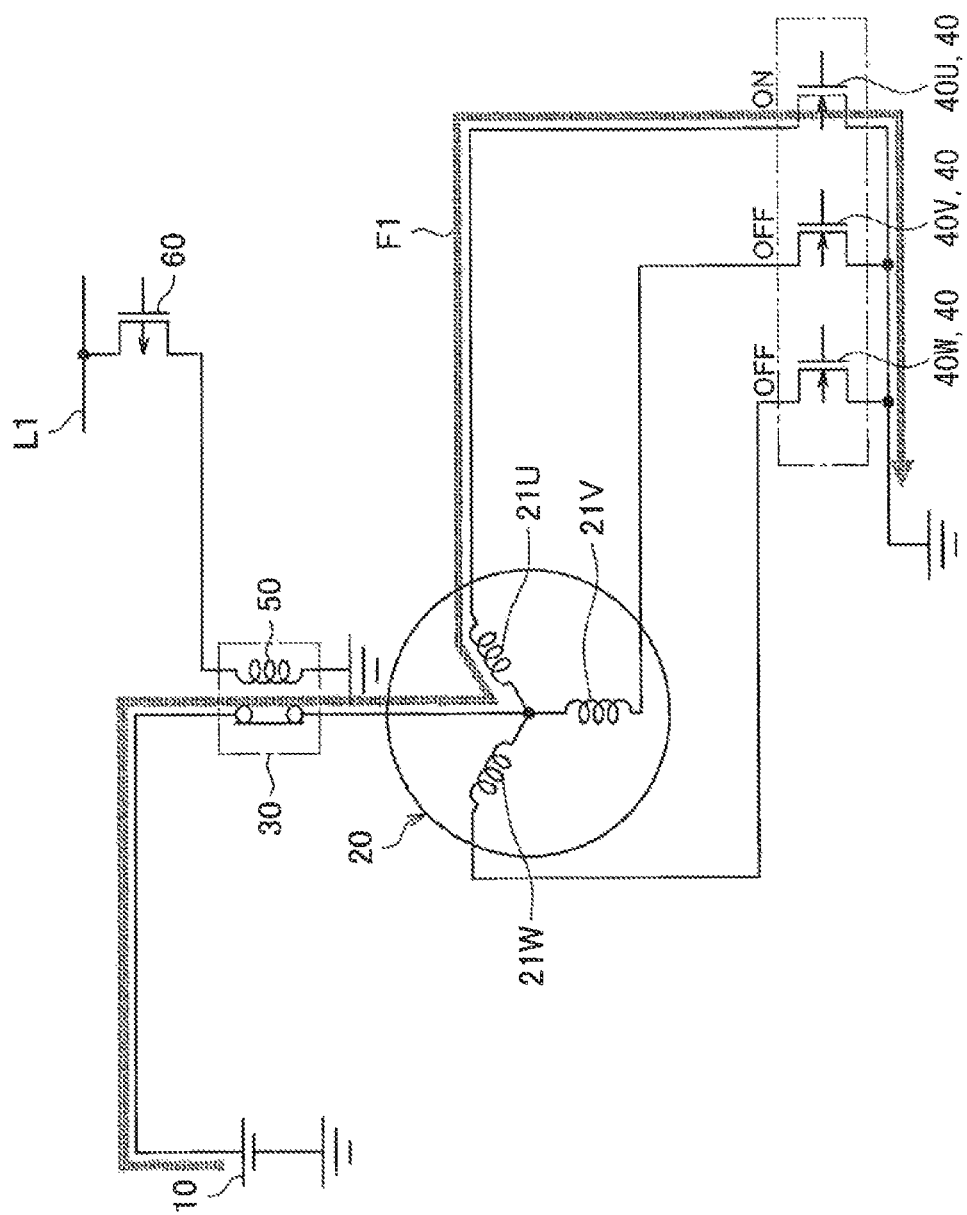
FIG. 4 is a schematic diagram illustrating an example of a flow of a current in forced driving control.

FIG. 4 is a schematic diagram illustrating an example of a flow of a current in the forced driving control. In FIG. 4, the flow of a current that flows in a case where the switch 40U provided for the U-phase is closed in the forced driving control is indicated by an arrow F1. In FIG. 4, the closed or open state of each switch 40 is indicated by "ON" or "OFF." "ON" indicates the closed state, and "OFF" indicates the open state.

In a case where the relay 30 has performed the closing operation, for example, even if the relay 30 experiences a continuity defect caused by an oxide film formed therein, the auxiliary battery 10 and the motor 20 may be physically coupled to each other via the relay 30. In this example, as the forced driving control is executed, as illustrated in FIG. 4, a closed circuit in which the auxiliary battery 10, the relay 30, the coil 21U of the motor 20, and the switch 40U are coupled in series in this order may be formed upon the switch 40U having entered a closed state, for example. Therefore, power may be supplied from the auxiliary battery 10 to the motor 20, and this may allow a large current of a magnitude corresponding to an inrush current to flow through the relay 30.

In this manner, executing the forced driving control at the time of the closing operation of the relay 30 may allow a large current of a magnitude corresponding to an inrush current to flow through the relay 30 even in a case where the relay 30 is experiencing a continuity defect. This allows dielectric breakdown to be produced in the oxide film formed in the relay 30, making it possible to appropriately resolve the continuity defect in the relay 30.

Figure 5:
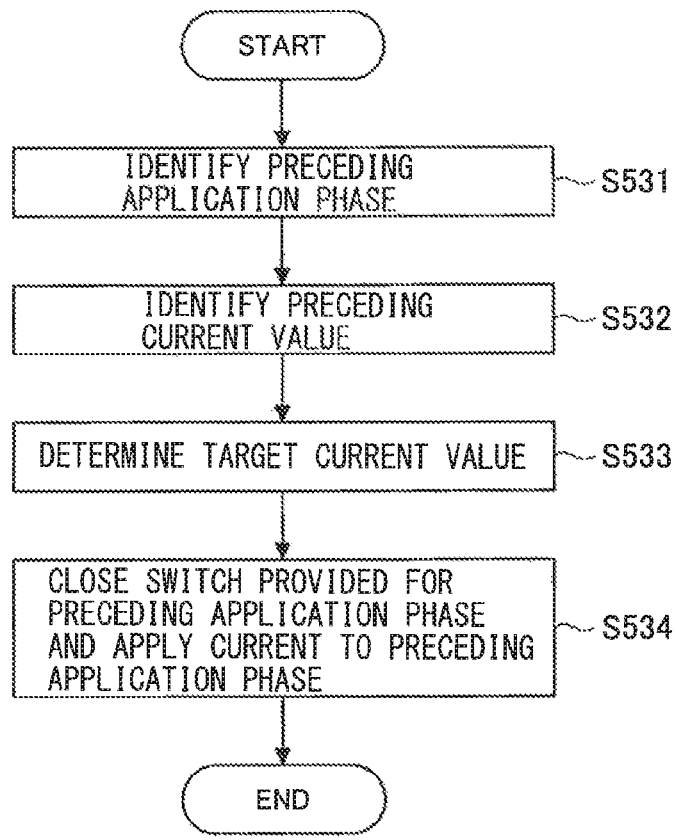
FIG. 5 is a flowchart illustrating an example of a flow of a process in the forced driving control to be performed by the controller according to the example embodiment.
Figure 6:
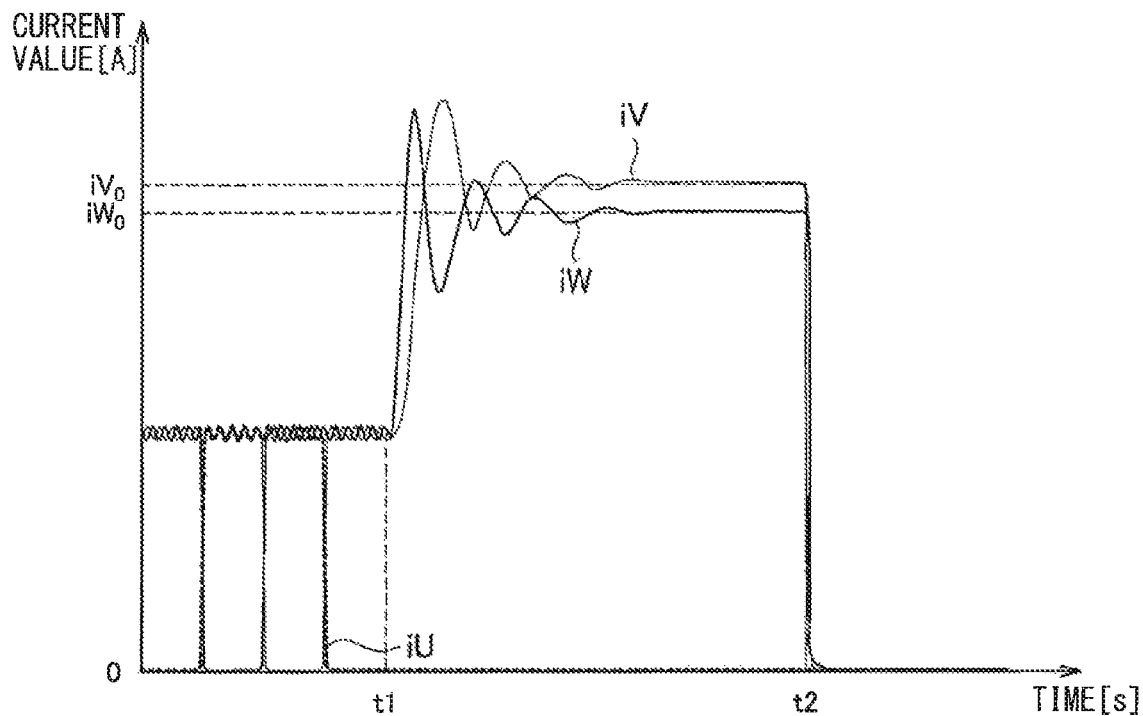
FIG. 6 is a schematic diagram illustrating an example of variation in a current value of a current flowing through each phase of a motor in a shift change into a P range.

In this example, as described above, power may be supplied to the motor 20 independently of the request for driving the motor 20 in the forced driving control. Therefore, in one example embodiment, unintended behavior of the motor 20 may be suppressed. With reference to FIGS. 5 and 6, a process of suppressing the unintended behavior of the motor 20 in the forced driving control will be described below.

FIG. 5 is a flowchart illustrating an example of a flow of a process to be performed by the control device 100 in the forced driving control. In a specific but non-limiting example, the control flow illustrated in FIG. 5 may correspond to an example of the flow of the process in step S530 illustrated in FIG. 3.

Upon the control flow illustrated in FIG. 5 starting, in step S531, the control device 100 may first identify the phase, of the phases of the motor 20, on which preceding current application has been performed. This phase may also be referred to below as a preceding application phase.

FIG. 6 is a schematic diagram illustrating an example of variation in the current value of the current flowing through each phase of the motor 20 in the shift change into the P range. In a specific but non-limiting example, FIG. 6 illustrates variation in a current value iU of the current flowing through the U-phase, variation in a current value iV of the current flowing through the V-phase, and variation in a current value iW of the current flowing through the W-phase.

As described above, the power supply system 1 may be stopped in a state in which the shift range is in the P range. Therefore, the motor 20 may have been driven most recently to make a shift change to the P range. For example, in the example illustrated in FIG. 6, the motor 20 may so rotate as to bring the angle of rotation θ of the motor 20 closer to the angle corresponding to the P range at and before a time t1. The current values iU, iV, and iW may so vary as to make a switch in order among a state in which the current flows mainly through the V-phase and the W-phase of the U-phase, the V-phase, and the W-phase, a state in which the current flows mainly through the U-phase and the V-phase, and a state in which the current flows mainly through the W-phase and the U-phase before the time t1.

Thereafter, the angle of rotation θ of the motor 20 may reach the angle corresponding to the P range at the time t1. As the rotation of the motor 20 stops, a relatively-large current may continue to flow through any two phases of the U-phase, the V-phase, and the W-phase after the time t1, for example, through the V-phase and the W-phase in the example illustrated in FIG. 6. The stopping of the rotation of the motor 20 described above may be also referred to below as a locked state. For example, FIG. 6 illustrates a state in which the current value iV and the current value iW are each retained at a relatively high value after the time t1. Thereafter, triggered by the detection of the locked state described above, power supply to the motor 20 may stop at a time t2.

For example, the control device 100 may store, with the use of a storage device, information indicating the last phase on which most-recent current application (i.e., the preceding current application) has been performed in most-recent driving of the motor 20 to make a shift change to the P range. For example, in the example illustrated in FIG. 6, the control device 100 may store information indicating that the preceding current application has been performed on to the V-phase and the W-phase. Thus, by referring to the stored information, the control device 100 may be able to identify the preceding application phase, e.g., the V-phase and the W-phase in the example illustrated in FIG. 6.

Thereafter, in step S532, the control device 100 may identify the current value of the current applied to the preceding application phase at the end of the preceding current application. This current value may also be referred to below as a preceding current value.

For example, the control device 100 may store, with the use of a storage device, information indicating the current value of most-recent current application, i.e., the preceding current value, in the most-recent driving of the motor 20 to make a shift change to the P range. For example, in the example illustrated in FIG. 6, the control device 100 may store information indicating a preceding current value iV0 of the V-phase and a preceding current value iW0 of the W-phase. Thus, by referring to the stored information, the control device 100 may be able to identify the preceding current value, e.g., the preceding current value iV0 of the V-phase and the preceding current value iW0 of the W-phase in the example illustrated in FIG. 6.

Thereafter, in step S533, the control device 100 may determine a target value of a current value of a current to be applied to the motor 20 in the forced driving control. This target value may also be referred to below as a target current value.

As will be described later, according to the control flow illustrated in FIG. 5, a current may be applied to the preceding application phase in the forced driving control. Therefore, the target current value determined in step S533 may correspond to the target value of the current value of the current to be applied to the preceding application phase in the forced driving control.

In one example embodiment, from the viewpoint of effectively suppressing the unintended behavior of the motor 20, the control device 100 may determine the current value corresponding to the preceding current value as the target current value and thereby control the current value of the current to be applied to the preceding application phase to the target current value determined in the stated manner. For example, the current value corresponding to the preceding current value may include, aside from the current value that matches the preceding current value, a current value obtained by adjusting as appropriate the current value that matches the preceding current value.

Therefore, determining the target current value as described above makes it possible to bring the current value of the current to be applied to the preceding application phase closer to the preceding current value. Accordingly, it is possible to suppress an excessive increase in the torque of the motor 20 while suppressing an excessive decrease in the current flowing through the relay 30 in the forced driving control. This configuration makes it possible to appropriately suppress damage to a component, vibrations, and noise.

In one example embodiment, from the viewpoint of effectively suppressing the unintended behavior of the motor 20, the control device 100 may determine, as the target current value, the current value adjusted on the basis of a relationship between an index that correlates with the temperature of the motor 20 held at the end of the preceding current application (e.g., the temperature of the motor 20 itself) and the above-described index at the present moment and thereby control the current value of the current to be applied to the preceding application phase to the target current value determined in the stated manner. In adjusting the current value with the use of the index described above, the current value may be so adjusted as to bring the torque of the motor 20 closer to the torque held at the end of the preceding current application. In this example, as the temperature of the motor 20 is higher, a resistance value of each coil of the motor 20 may be higher. Therefore, in a case where the current to be applied is constant, the torque of the motor 20 may be reduced. Accordingly, in a case where the current value of the current to be applied to the preceding application phase is controlled to the current value that matches the preceding current value, a difference may arise in the torque in accordance with a difference in the temperature of the motor 20 between the end of the preceding current application and the present moment.

Accordingly, determining the target current value as described above makes it possible to bring the torque of the motor 20 produced in the forced driving control closer to the torque held at the end of the preceding current application. It is therefore possible to more appropriately suppress the excessive increase in the torque of the motor 20 while suppressing the excessive decrease in the current flowing through the relay 30 in the forced driving control. This configuration makes it possible to more appropriately suppress damage to a component, vibrations, and noise.

Thereafter, in step S534, the control device 100 may close the switch 40 provided for the preceding application phase and apply a current to the preceding application phase.

For example, in the example illustrated in FIG. 6, since the V-phase and the W-phase have been identified as the preceding application phases, the switch 40V provided for the V-phase and the switch 40W provided for the W-phase may be closed, and a current may be applied to the V-phase and the W-phase. In the example illustrated in FIG. 6, the current has been made to flow through the V-phase and the W-phase while the motor 20 is in the locked state in the preceding current application. Therefore, in a case where a current is applied to the V-phase and the W-phase, that are the preceding application phases, in the forced driving control, the torque of the motor 20 may be produced, but the motor 20 may not rotate. In this manner, applying a current to the preceding application phase in the forced driving control makes it possible to suppress the rotation of the motor 20 corresponding to the unintended behavior of the motor 20. This makes it possible to suppress damage to a component, vibrations, and noise.

In a specific but non-limiting example, in step S534, the control device 100 may use the target current value determined in step S533 as the target value of the current value of the current to be applied to the preceding application phase. Therefore, the control device 100 may be able to control the current value of the current to be applied to the preceding application phase to the current value corresponding to the preceding current value, for example. In addition, for example, the control device 100 may be able to so adjust the current value of the current to be applied to the preceding application phase as to bring the torque of the motor 20 closer to the torque held at the end of the preceding current application, on the basis of the relationship between the index that correlates with the temperature of the motor 20 held at the end of the preceding current application (e.g., the temperature of the motor 20 itself) and the above-described index at the present moment.

The control device 100 may be able to adjust the current value of the current to be applied to each phase by controlling a voltage of an electric signal outputted to each switch 40, for example. The current value of the current to be applied to each phase may also be adjusted by providing variable resistances in series to the respective switches 40 and controlling the resistance values of the respective variable resistances.

Thereafter, the control device 100 may terminate the control flow illustrated in FIG. 5.

Now, referring back to FIG. 3, a process following step S530 will be described. After step S530, in step S540, the control device 100 may redetermine whether the continuity in the relay 30 is normal. In a case where the control device 100 has determined that the continuity in the relay 30 is normal (YES in step S540), the control device 100 may terminate the control flow illustrated in FIG. 3. In contrast, in a case where the control device 100 has redetermined that the continuity in the relay 30 is not normal (NO in step S540), the flow may proceed to step S550.

In a case where the determination is NO in step S540, in step S550, the control device 100 may execute hammering control. The hammering control may be control of repeatedly opening and closing the relay 30.

In a specific but non-limiting example, the control device 100 may repeatedly perform switching between a state in which power is supplied from the power line L1 to the electromagnetic coil 50 and a state in which power supply from the power line L1 to the electromagnetic coil 50 is cut off by repeatedly opening and closing the switch 60 in the hammering control. This may allow the relay 30 to be repeatedly opened and closed.

The case where the hammering control is executed may correspond to a case where the continuity defect in the relay 30 has not been resolved although the forced driving control has been executed. In this example, causes for the continuity defect in the relay 30 may include, aside from the oxide film formed in the relay 30, ice that has adhered to the relay 30 due to freezing of vapors around the relay 30. In a case where the continuity defect is occurring in the relay 30 due to the ice that has adhered to the relay 30, it may be difficult to resolve the continuity defect in the relay 30 through the forced driving control. Therefore, a situation may arise in which the continuity defect in the relay 30 has not been resolved although the forced driving control has been executed. Therefore, in such a situation, executing the hammering control may allow the ice that has adhered to the relay 30 to be crushed. Tt is thereby possible to resolve the continuity defect in the relay 30. For example, it may be possible to appropriately crush the ice that has adhered to the relay 30 by continuing the hammering control until it is determined that the continuity in the relay 30 has become normal.

Thereafter, the control device 100 may terminate the control flow illustrated in FIG. 3.

[3. Example Effects of Power Supply System]

Next, some example effects of the power supply system 1 according to the example embodiment will be described.

In the power supply system 1 according to the example embodiment, the control device 100 may execute the forced driving control of supplying power from the auxiliary battery 10 to the motor 20 by closing the switch 40 independently of the request for driving the motor 20 at the time of the closing operation of the relay 30. Accordingly, even in a case where the relay 30 is experiencing a continuity defect at the time of the closing operation of the relay 30, it is possible to cause a large current of a magnitude corresponding to an inrush current to flow through the relay 30. This allows dielectric breakdown to be produced in the oxide film formed in the relay 30. Accordingly, it is possible to appropriately resolve the continuity defect in the relay 30.

In the power supply system 1 according to the example embodiment, the control device 100 may determine whether the continuity in the relay 30 is normal at the time of the closing operation of the relay 30 and execute the forced driving control in a case where the control device 100 has determined that the continuity in the relay 30 is not normal. This makes it possible to suppress unnecessary execution of the forced driving control. It is therefore possible to suppress unintentional driving of the motor 20 at the time of the closing operation of the relay 30.

In the power supply system 1 according to the example embodiment, the control device 100 may redetermine whether the continuity in the relay 30 is normal after executing the forced driving control and execute the hammering control of repeatedly opening and closing the relay 30 in a case where the control device 100 has redetermined that the continuity in the relay 30 is not normal. This makes it possible to resolve the continuity defect in the relay 30 even in a case where the relay 30 is experiencing the continuity defect due to ice that has adhered to the relay 30. Furthermore, in a case where the control is performed in the processing flow described above, the forced driving control may be executed before the hammering control. Therefore, it is possible to suppress unnecessary execution of the hammering control in a case where the relay 30 is experiencing the continuity defect due to the oxide film formed in the relay 30. This makes it possible to suppress early wearing of the relay 30.

In the power supply system 1 according to the example embodiment, the control device 100 may close the one or more switches 40 provided for a portion or all of the phases of the motor 20 in the forced driving control. Thereby, in a case where the load to which power is to be supplied in the forced driving control is a polyphase motor, as in the power supply system 1, and where a switch is provided for each phase of the motor, it is possible to appropriately cause a large current of a magnitude corresponding to an inrush current to flow through the relay through the forced driving control.

In the power supply system 1 according to the example embodiment, the angle of rotation θ of the motor 20 may be in a state of being restricted to a predetermined angle, e.g., the angle corresponding to the P range, when the relay 30 is in the open state, and the control device 100 may close the switch 40 provided for the phase, of the phases of the motor 20, on which preceding current application has been performed, i.e., the preceding application phase, in the forced driving control. Thereby, as the forced driving control is executed, it is possible to suppress rotation of the motor 20. Accordingly, it is possible to suppress damage to a component, vibrations, and noise.

In the power supply system 1 according to the example embodiment, the control device 100 may control, in the forced driving control, the current value of the current to be applied to the phase, of the phases of the motor 20, on which the preceding current application has been performed, i.e., the preceding application phase, to the current value corresponding to the current value of the current applied to this phase at the end of the preceding current application, i.e., the preceding current value. This makes it possible to bring the current value of the current to be applied to the preceding application phase closer to the preceding current value. Therefore, it is possible to suppress excessive increase in the torque of the motor 20 while suppressing excessive decrease in the current flowing through the relay 30 in the forced driving control. Accordingly, it is possible to appropriately suppress damage to a component, vibrations, and noise.

In the power supply system 1 according to the example embodiment, the control device 100 may so adjust the current value of the current to be applied to the phase, of the phases of the motor 20, on which the preceding current application has been performed, i.e., the preceding application phase, as to bring the torque of the motor 20 closer to the torque held at the end of the preceding current application on the basis of the relationship between the index that correlates with the temperature of the motor 20 held at the end of the preceding current application and the index at the present moment in the forced driving control. This makes it possible to bring the torque of the motor 20 produced in the forced driving control closer to the torque held at the end of the preceding current application. Therefore, it is possible to more appropriately suppress the excessive increase in the torque of the motor 20 while suppressing the excessive decrease of the current flowing through the relay 30 in the forced driving control. Accordingly, it is possible to more appropriately suppress damage to a component, vibrations, and noise.

[4. Conclusion]

As described above, according to one embodiment of the technology, in a case where a continuity defect occurs in a relay included in a power supply system, it is possible to appropriately resolve or at least mitigate the continuity defect.

Thus far, some example embodiments of the technology have been described in detail with reference to the appended drawings, but the technology is not limited to the above examples. It is apparent that any person having ordinary skills in the art to which the technology belongs may conceive of various modification examples and application examples within the technical idea set forth by the appended claims, and it should be appreciated that these modification examples and application examples are encompassed by the technical scope of the technology.

For example, in the examples described above, the motor 20 corresponds to the load according to one embodiment of the technology, but the load according to one embodiment of the technology may be a different load. The load according to one embodiment of the technology may be any load that at least consumes supplied power. Examples thereof may include a motor different from the motor 20, for example but not limited to, a three-phase three-wire motor coupled to a power source via an inverter and a motor that finds its application in other than so-called shift-by-wire, and a load other than a motor.

For example, a power supply system according to one embodiment of the technology may be a power supply system in which another constituent element is added to the power supply system 1 illustrated in FIG. 1 or a power supply system in which one or more constituent elements of the power supply system 1 are omitted.

In addition, for example, the processes described with reference to the flowcharts in the specification do not necessarily need to be executed in the order indicated in the flowcharts. Furthermore, one or more additional processing steps may be employed, or one or more of the processing steps may be omitted.

The control device 100 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control device 100 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control device 100 illustrated in FIG. 1.

The invention claimed is:

1. A power supply system, comprising:
a power source;
a relay interposed between the power source and a load;
a switch configured to couple to the load in a state where the switch allows or disallows for power supply from the power source to the load when the relay is in a closed state; and
a controller configured to control an operation of the switch,
the controller being configured to execute a forced driving control at a time of a closing operation of the relay, the forced driving control causing the switch to operate independently of a request for driving the load and thereby causing power to be supplied from the power source to the load, wherein the relay is connected to the load independently of the switch being coupled to the load, wherein the controller is configured to determine, at the time of the closing operation of the relay, whether continuity in the relate is normal, wherein the controller is configured to execute the forced driving control in a case where the continuity in the relay is determined as not being normal, wherein the load comprises a polyphase electric motor having two or more phases, wherein the switch comprises two or more switches, wherein the switches are provided for the respective phases of the electric motor, wherein the controller is configured to close one or more of the switches provided for a portion or all of the phases of the electric motor in the forced driving control, wherein the electric motor is configured to have an angle of rotation of the electric motor to be restricted to a predetermined angle when the relay is in an open state, and wherein the controller is configured to close one, of the switches, provided for a preceding application phase in the forced driving control, the preceding application phase being one, of the phases of the electric motor, on which preceding current application has been performed.

2. The power supply system according to claim 1, wherein the controller is configured to redetermine, after executing the forced driving control, whether the continuity in the relay is normal, and the controller is configured to execute a hammering control in a case where the continuity in the relay is redetermined as not being normal, the hammering control repeatedly opening and closing the relay.

3. The power supply system according to claim 1, wherein the controller is further configured to control a current value of a current to be supplied to the electric motor, and the controller is configured to control, in the forced driving control, a current value of a current to be applied to the preceding application phase to a current value corresponding to a current value of a current applied to the preceding application phase at an end of the preceding current application.

4. The power supply system according to claim 3, wherein the controller is configured to adjust, in the forced driving control, the current value of the current to be applied to the preceding application phase to bring torque of the electric motor closer to torque held at the end of the preceding current application, on a basis of a relationship between an index that correlates with a temperature of the electric motor held at the end of the preceding current application and the index held at a present moment.

5. A method of controlling a power supply system including a power source, a relay interposed between the power source and a load, and a switch coupled to the load in a state where the switch allows or disallows for power supply from the power source to the load when the relay is in a closed state, wherein the relay is connected to the load independently of the switch being coupled to the load, the method comprising:

detecting an operation state of the relay at a time of a closing operation of the relay;

allowing or disallowing for the power supply from the power source to the load in accordance with a request for driving the load when the detected operation state indicates that the relay is in a usual operation state; and causing the switch to operate independently of the request for driving the load and thereby causing power to be supplied from the power source to the load, when the detected operation state indicates that the relay is in an abnormal continuity state, wherein the controller is configured to determine, at the time of the closing operation of the relay, whether continuity in the relay is normal, wherein the controller is configured to execute the forced driving control in a case where the continuity in the relay is determined as not being normal, wherein the load comprises a polyphase electric motor having two or more phases, wherein the switch comprises two or more switches, wherein the switches are provided for the respective phases of the electric motor, wherein the controller is configured to close one or more of the switches provided for a portion or all of the phases of the electric motor in the forced driving control, wherein the electric motor is configured to have an angle of rotation of the electric motor to be restricted to a predetermined angle when the relay is in an open state, and wherein the controller is configured to close one, of the switches, provided for a preceding application phase in the forced driving control, the preceding application phase being one, of the phases of the electric motor, on which preceding current application has been performed.

* * * * *